(12) United States Patent
Kim et al.

(10) Patent No.: US 11,124,068 B2
(45) Date of Patent: Sep. 21, 2021

(54) ACCELERATION PEDAL FOR VEHICLE

(71) Applicants: Hyundai Motor Company, Seoul (KR); Kia Motors Corporation, Seoul (KR)

(72) Inventors: Yeong Jik Kim, Chungcheongbuk-do (KR); Joon Young Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/896,862

(22) Filed: Jun. 9, 2020

(65) Prior Publication Data

US 2021/0178896 A1 Jun. 17, 2021

(30) Foreign Application Priority Data

Dec. 12, 2019 (KR) .................. 10-2019-0165178

(51) Int. Cl.
*G05G 1/30* (2008.04)
*B60K 26/02* (2006.01)
(Continued)

(52) U.S. Cl.
CPC ...... *B60K 26/021* (2013.01); *B60K 2026/023* (2013.01)

(58) Field of Classification Search
CPC ............ B60K 26/021; B60K 2026/023; B60K 26/02; B60K 26/04; B60K 7/0007;
(Continued)

(56) References Cited

U.S. PATENT DOCUMENTS

2007/0151398 A1* 7/2007 Kim .................. G05G 5/03
74/513
2007/0157755 A1* 7/2007 Kim .................. G05G 1/483
74/513
(Continued)

FOREIGN PATENT DOCUMENTS

CA 2998487 A1 * 3/2017
DE 102006035882 A1 * 2/2008 ............. B60K 26/02
(Continued)

OTHER PUBLICATIONS

Definitions Controller, Dictionary.com., Nov. 13, 2020 (Year: 2020).*

*Primary Examiner* — Vinh Luong
(74) *Attorney, Agent, or Firm* — Mintz Levin Cohn Ferris Glovsky and Popeo, P.C.; Peter F. Corless (57) ABSTRACT

An accelerator pedal for a vehicle is provided, which includes a member that is fixed to a bottom of the vehicle, a pedal part that is pivotally fastened to an upper surface of the member, and an arm assembly that is positioned on the member and configured to be rotated based on an input onto the pedal part. A spring is configured to come in contact with the arm assembly and a wheel assembly is disposed adjacent to a first end of the arm assembly to provide a foot effort to the arm assembly. A controller is configured to apply the foot effort to the arm assembly in a state where the wheel assembly is configured to selectively come in contact with the first end of the arm assembly.

9 Claims, 6 Drawing Sheets

(51) Int. Cl.
*B60K 26/04* (2006.01)
*G05G 1/44* (2008.04)
*G05G 5/05* (2006.01)
*B60T 7/06* (2006.01)
*B60T 7/04* (2006.01)

(58) Field of Classification Search
CPC ...... B60K 2026/046; G05G 1/38; G05G 1/44; G05G 1/305; G05G 5/05; B60T 7/06; B60T 7/042; B62K 2026/023
See application file for complete search history.

(56) References Cited

U.S. PATENT DOCUMENTS

| | | | |
|---|---|---|---|
| 2014/0142806 A1* | 5/2014 | Min | G05G 5/03 701/36 |
| 2014/0163818 A1* | 6/2014 | Min | B60W 30/02 701/36 |
| 2014/0316649 A1* | 10/2014 | Min | B60K 26/021 701/36 |
| 2015/0143944 A1* | 5/2015 | Zell | G05G 5/03 74/514 |
| 2018/0253120 A1* | 9/2018 | Kim | G05G 5/05 |
| 2019/0361480 A1* | 11/2019 | Kim | G05G 1/44 |
| 2020/0254874 A1* | 8/2020 | Kim | G05G 1/44 |

FOREIGN PATENT DOCUMENTS

| | | | | |
|---|---|---|---|---|
| KR | 20110062017 A | * | 10/2011 | ........... B60K 26/021 |
| KR | 20130053996 A | * | 5/2013 | ............. B60K 26/00 |
| KR | 101491182 B1 | | 2/2015 | |

* cited by examiner

ACCELERATION PEDAL FOR VEHICLE

CROSS-REFERENCE TO RELATED APPLICATION

This application claims under 35 U.S.C. § 119(a) the benefit of priority to Korean Patent Application No. 10-2019-0165178 filed on Dec. 12, 2019, the entire contents of which are incorporated herein by reference.

BACKGROUND

(a) Technical Field

The present disclosure relates to an acceleration pedal for a vehicle, and more particularly, to an accelerator pedal for a vehicle having a foot effort generation structure that corresponds to an input onto a pedal part.

(b) Background Art

An accelerator pedal enables a user to accelerate the rotation of an engine. The user engages the accelerator pedal by exerting force onto the pedal to increases the rotating speed of the engine, and disengages the accelerator pedal to decrease the rotating speed of the engine. The accelerator pedal is connected to a throttle valve through a wire and a linkage. When the user engages the accelerator pedal, the throttle valve is opened to suction air into a cylinder, and an electronically controlled fuel injection device detects an air amount and supplies gasoline suitable to an engine operation state.

An accelerator pedal is classified into a mechanical accelerator pedal and an electronic accelerator pedal. The mechanical accelerator pedal is a pedal type in which the accelerator pedal and the throttle value of the engine are mechanically connected to each other through a cable. The electronic accelerator pedal is a pedal type in which the position of the pedal is sensed by a sensor and the operation of the throttle value is controlled based on the sensed position signal.

The mechanical accelerator pedal causes an operational problem due to a surrounding environment, temperature change, cable deterioration, and so on. Accordingly, at present, the mechanical accelerator pedal has been replaced by the electronic accelerator pedal. Since the electronic accelerator pedal does not require a cable, it has sufficient room for installation, and thus may reduce a driver's fatigue with an improved fuel economy.

However, the driver may prefer a tactile response in which the driver feels from the mechanical accelerator pedal in the related art. Further, to reduce the driver's fatigue due to the operation of the electronic accelerator pedal, hysteresis is required to be created. The hysteresis effect may reduce the fatigue caused by the driver's repeated operations. As a foot effort creation technology applied to the electronic accelerator pedal in the related art, systems for providing a foot effort using a rotary motor and a plurality of gears have been developed, but they have complex structures and require an increased number of components.

The above information disclosed in this section is merely for enhancement of understanding of the background of the invention and therefore it may contain information that does not form the prior art that is already known in this country to a person of ordinary skill in the art.

SUMMARY

The present disclosure provides a specific foot effort to a pedal part by applying a reaction force to an arm assembly through providing of a wheel assembly positioned adjacent to the arm assembly. Another object of the present disclosure is to provide a foot effort through a wheel assembly by adjusting magnetism of a magnetic member.

Further, the present disclosure provides an accelerator pedal structure for a vehicle that may include a friction member of an arm assembly that comes in contact with a wheel assembly. The objects of the present disclosure are not limited to those as described above, and other unmentioned objects of the present disclosure maybe understood by the following explanation, and can be known more clearly by exemplary embodiments of the present disclosure. Further, the objects of the present disclosure can be realized by means and combinations thereof indicated in claims.

In one aspect of the present disclosure, an accelerator pedal for a vehicle may include a member fixed to a bottom of the vehicle; a pedal part pivotally fastened to an upper surface of the member; an arm assembly positioned on the member and configured to be rotated in accordance with an input onto the pedal part; a spring configured to come in contact with the arm assembly; a wheel assembly configured to be adjacent to one end of the arm assembly and to provide a foot effort to the arm assembly; and a controller configured to apply the foot effort to the arm assembly in a state where the wheel assembly is configured to selectively come in contact with the one end of the arm assembly.

The wheel assembly may further include a lever arm positioned on an inside of a cover part and configured to be rotatable; a contact member positioned at a first end of the lever arm facing the arm assembly; a coil spring positioned on an inside of the contact member and configured to apply a reaction force to the contact member; a hinge pin fixed to the member to rotate the lever arm; and a fixing pin configured to fix the contact member to the lever arm. The wheel assembly may also include a driving unit disposed at a second end of the lever arm and configured to apply a rotating force to rotate the lever arm around the hinge pin.

The driving unit may include a metal member positioned on the lever arm; and a magnetic member positioned adjacent to the metal member. The magnetic member may be configured to receive a magnetic force being applied thereto by the controller and to selectively come in contact with the metal member. A first end of the coil spring may be fixed by the fixing pin, and a second end of the coil spring may be fixed to the contact member.

The arm assembly may include an arm hinge part positioned adjacent to the wheel assembly and an arm lever positioned between the pedal part and the arm hinge part. The arm hinge part may further include a friction member disposed at a position where the arm hinge part comes in contact with the wheel assembly. One end of the wheel assembly adjacent to the arm hinge part may be shaped as a circular arc. The spring part may be positioned between the arm lever and the member. The wheel assembly may be configured to be rotated to come in contact with the arm assembly corresponding to a foot effort generation signal of the controller to apply the foot effort to the pedal part.

According to the present disclosure, the following effects may be obtained through the combination and usage relationships between the above-described exemplary embodiment and the configuration to be described below. The present disclosure has effects to provide the accelerator pedal for the vehicle having high user satisfaction by providing effects to apply the foot effort to the pedal part through a simplified structure.

Further, the present disclosure has effects to provide the accelerator pedal for the vehicle having an increased convenience in repair by facilitating replacement of the friction member positioned on the arm assembly. Further, the present disclosure provides effects to reduce the user's fatigue even in a long-term driving.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present disclosure, examples of which are illustrated in the accompanying drawings and described below. While the present disclosure will be described in conjunction with exemplary embodiments, it will be understood that present description is not intended to limit the present disclosure to those exemplary embodiments. On the contrary, the present disclosure is intended to cover not only the exemplary embodiments, but also various alternatives, modifications, equivalents and other embodiments, which may be included within the spirit and scope of the invention as defined by the appended claims.

The term "~part", "~member", or "~assembly" as described in the description may mean a unit for processing at least one function or operation, and this may be implemented by hardware, software, or a combination of hardware and software. Further, as configurations of the present disclosure, a pedal part, an arm assembly, and a spring may be manufactured as one form, or may be fastened to one another as separate components, and they are discriminated in accordance with positions where they perform respective functions.

The present disclosure relates to an accelerator pedal 100 for a vehicle, which may include a pedal part 110 disposed on a member 120 fixed to a bottom of the vehicle, a connecting part 130 configured to transfer an input onto the pedal part 110 to an arm assembly 200, and a spring 230 configured to apply an elastic force to the arm assembly 200 that corresponds to the pressure input onto the pedal part 110. Further, the accelerator pedal 100 may include a wheel assembly 300 configured to provide a foot effort that corresponds to the input onto the pedal part 110, and one end of the wheel assembly 300 and a part of the arm assembly may be configured to selectively come in contact with each other to provide the foot effort in accordance with the change of the pedal part 110.

Figure 1:
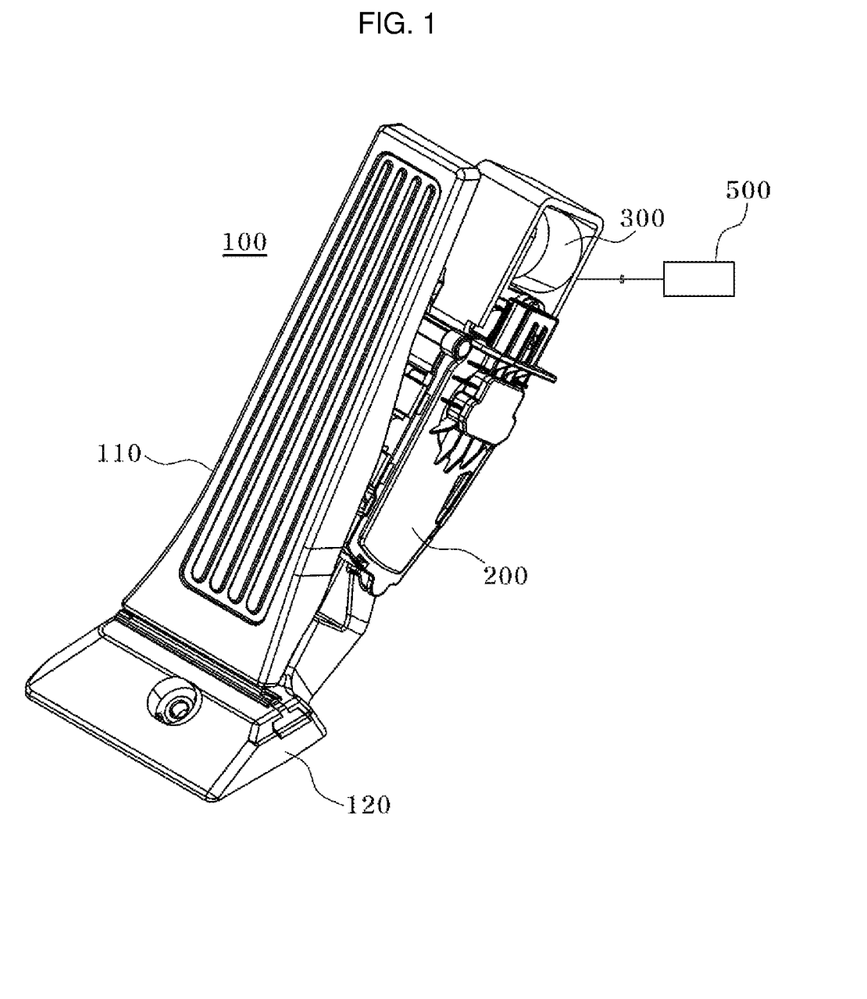
FIG. 1 is a perspective view of an accelerator pedal for a vehicle according to an exemplary embodiment of the present disclosure.
Figure 2:
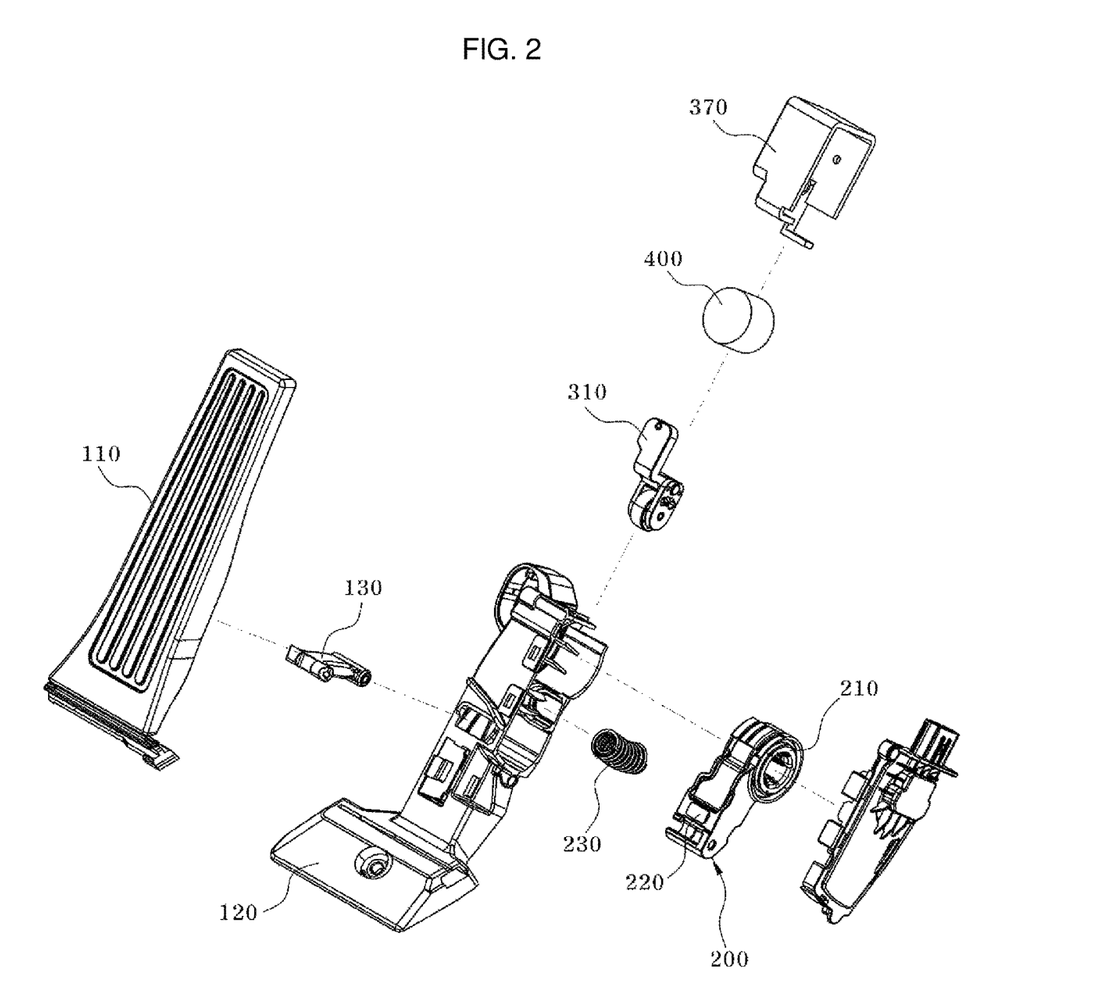
FIG. 2 is a view illustrating the configuration of an acceleration pedal for a vehicle according to an exemplary embodiment of the present disclosure.

FIG. 1 is a perspective view of an accelerator pedal 100 for a vehicle according to an exemplary embodiment of the present disclosure, and FIG. 2 is a view illustrating the configuration of an acceleration pedal 100 for a vehicle according to the present disclosure. As illustrated, the accelerator pedal 100 may include the pedal part 110 disposed on the member 120, the arm assembly 200 disposed on an inside of the member 120, and the wheel assembly 300 configured to extend from one end of the arm assembly 200.

The pedal part 110 and the arm assembly 200 may interlock with each other through the connecting part 130 configured to penetrate an upper surface of the member 120. The arm assembly 200 may interlock with the pedal part 110 based on the input (e.g., the force exerted) onto the pedal part 110 through the connecting part 130, and the elastic force may be applied to the arm assembly 200 through the spring 230 that comes in contact with the rear surface of the arm assembly 200.

A first end of arm assembly 200 fastened to the connecting part 130 may be rotated, and an arm lever 220 may be rotated corresponding to the pressure of the connecting part 130 based on an arm hinge part 210 positioned at a second end of the arm assembly 200. Further, the spring part 230 may come in contact with the rear surface of the arm lever 220 and an inner side surface of the member 120.

An electronic accelerator pedal position sensor (APP) (not illustrated) may be configured to sense a rotating amount of the pedal part 110 to generate and transfer an electric signal to a controller 500, and the controller 500 may be configured to operate an actuator (not illustrated) based on the electric signal received from the sensor to control opening and closing of a throttle valve to thus adjust a combustion amount. Particularly, to sense the rotation amount of the pedal part 110, the electronic accelerator pedal position sensor may be disposed on the arm hinge part 210 and may be configured to sense the rotation amount of the arm hinge part 210.

The wheel assembly 300 fastened to a first end of the arm assembly 200 may include a lever arm 310 selectively rotated to come in contact with the first end of the arm assembly 200, a contact member 320 positioned at a first end of the lever arm facing the arm assembly 200, and a hinge pin 340 fixed to the member 120 to rotate the lever arm 310 and configured to penetrate the lever arm 310. The wheel assembly may further include a fixing pin 350 configured to fix the contact member 320 to the lever arm 310. In addition, the wheel assembly 200 may include a driving unit disposed at a second end of the lever arm spaced apart from the first end of the lever arm 310 on which the contact member 320 is positioned to rotate the lever arm 310.

The driving unit may include a metal member 360 disposed on the lever arm 310, and a magnetic member 400 configured to selectively come in contact with the metal member 360. The magnetic member may be fastened to the controller 500 and a magnetic force may be selectively applied thereto. When the magnetic force is applied to the magnetic member 400, the metal member 360 may be configured to move in a direction in which the magnetic member 400 is positioned. Accordingly, the first end of the lever arm 310 including the metal member 360 may be rotated in the direction in which the magnetic member 400 is positioned, and the contact member 320 may come in contact with the arm assembly 200.

Through the contact member 320 and the arm assembly 200 coming in contact with each other, the pedal part may be configured to increase the foot effort. In other words, the contact member 320 may be formed as a cylindrical shape, and an outer surface thereof may be made of a rubber material, and the contact member 320 may include a surface that continuously comes in contact with a friction member 240 In other words, when the metal part 360 positioned adjacent to the magnetic member 400 at the first end of the lever arm 310 is rotated around the hinge pin 340 to come in contact with the magnetic member 400, the contact member 320 positioned at the second end of the lever arm 310 may come in contact with the friction member 240 of the arm assembly 200 to apply a reaction force in a direction opposite to the rotation direction of the arm hinge part 210.

Particularly, the contact member 320 may be rotatable around the fixing pin 350 through a coil spring 330 fixedly positioned on the inside of the contact member 320 Accordingly, when the input is applied onto the pedal part 110, the arm hinge part 210 may be rotated to rotate the contact member 320 fastened to the arm hinge part 210, and the coil spring 330 may be simultaneously compressed so that the contact member 320 provides a reaction force to a part fastened to the arm hinge part 210.

The lever arm 310 may selectively come in contact with the magnetic member 400 based on current being applied to the controller 500, and the first end of the lever arm 310 on which the metal member 360 is positioned may be rotated. Further, with the rotation of the lever arm 310, the contact member 320 may be fastened to the friction member 240, and the contact member 320 may be rotated around the fixing pin 350 corresponding to the rotation of the arm assembly 200. Accordingly, the coil spring 330 fixed to the inside of the contact member 320 may be twisted to apply a reaction force to the friction member 240.

Figure 3:
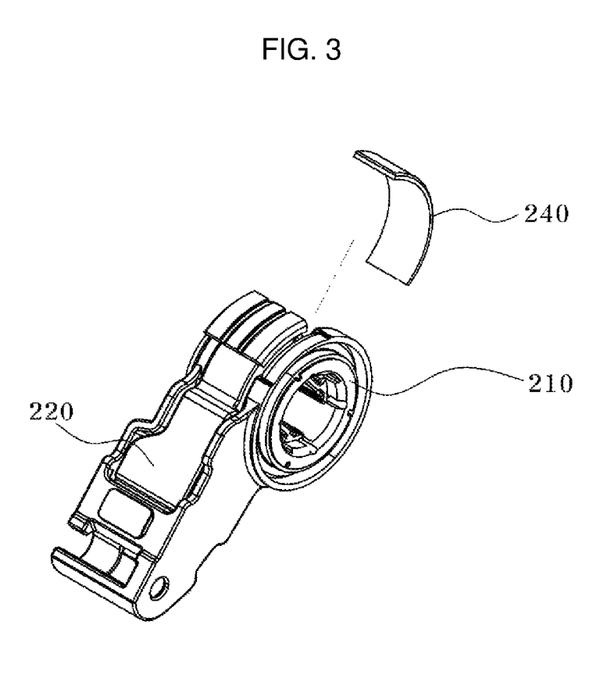
FIG. 3 is an enlarged view of an arm assembly constituting an acceleration pedal for a vehicle according to an exemplary embodiment of the present disclosure.

FIG. 3 is an enlarged view of an arm assembly 200 according to an exemplary embodiment of the present disclosure. The arm assembly 200 may include the arm lever 220, and a first end thereof may be fastened to the connection part 130. Further, the arm assembly 200 may include the arm hinge part 210 positioned at the second end of the arm lever 220, and the arm hinge part 210 may be fixed to the member 120 and the arm lever 220 may be rotated corresponding to the input onto the pedal part 110.

The friction member 240 may be disposed on an outer side surface of the arm hinge part 210 to selectively come in contact with the wheel assembly 300, and when the controller 500 applies the magnetic force to the magnetic member 400, the contact member 320 of the wheel assembly 300 comes in contact with the friction member 240. When the arm hinge part 210 is rotated in a state where the contact member 320 and the friction member come in contact with each other, the contact member 320 may be rotated in a direction opposite to the rotation direction of the arm hinge part 210, and thus the coil spring 330 positioned on the inside of the contact member 320 may be compressed.

Accordingly, the contact member 320, to which the reaction force of the compressed coil spring 330 is applied, may be configured to apply the foot effort (e.g., force exertion) to the pedal part 110 through the friction member 240 As described above, since the reaction force is applied corresponding to the movement direction of the arm hinge part 210 in a state where the friction member 240 comes in contact with the contact member 320, it may be possible to provide or exert the foot effort corresponding to the input (e.g., user force exertion) onto the pedal part 110. Further, by reducing an abrupt change of the foot effort of the pedal part 110, the user's fatigue caused by the input onto the pedal part 110 maybe minimized.

Figure 4:
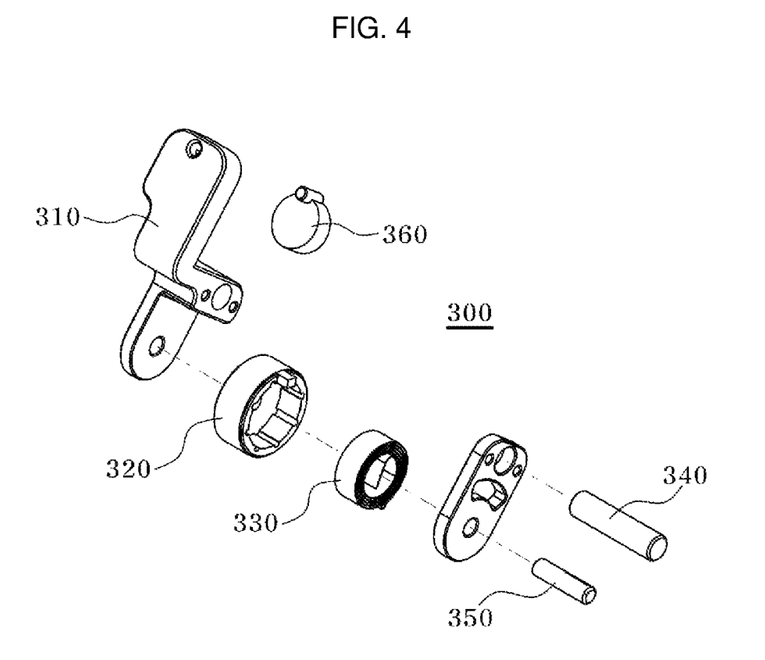
FIG. 4 is a view illustrating the configuration of a wheel assembly constituting an acceleration pedal for a vehicle according to an exemplary embodiment of the present disclosure.

FIG. 4 is a view illustrating the configuration of a wheel assembly 300 according to an exemplary embodiment of the present disclosure. As illustrated, the wheel assembly may include the lever arm 310 positioned on the inside of a cover part 370, the contact member 320 fastened to the lever arm 310, and the coil spring 330 positioned on the inside of the contact member 320. A first end of the coil spring 330 may be fixed to the lever arm 310 by the fixing pin 350, and a second end of the coil spring 330 may be fixed to a groove 321 positioned on the inner side surface of the contact member 320.

According to the present disclosure, the contact member 320 and the friction member 240 may be formed in the shape of circular arcs, and may be configured to apply a continuous foot effort (e.g., force exertion) based on the rotation of the arm hinge part 210. The coil spring 330 may be selectively fixed to a plurality of grooves 321 positioned on the inner side surface of the contact member 320. Accordingly, the contact member 320 may be rotated corresponding (e.g., in correlation with) to the rotation of the arm hinge part 210, and thus foot effort tuning of the compressed coil spring 330 maybe performed more easily.

The metal member 360 may be disposed at the second end of the lever arm 310 spaced apart from the first end of the lever arm 310 on which the contact member 320 is positioned, and thus the metal member 360 may be positioned adjacent to the magnetic member 400. The hinge pin 340 may be disposed between the contact member 320 and the metal member 360 as a center shaft on which the lever arm 310 is rotated. Accordingly, when the metal member 360 is selectively fastened to the magnetic member 400, the lever arm 310 may be rotated around the hinge pin 340. The controller 500 may be configured to apply the magnetic force to the magnetic member 400 configured at a position that corresponds to the metal member 360, and the lever arm 310 including the metal member 360 may be rotated in a direction close or proximate to the magnetic member 400, while the second end of the lever arm 310 comes in contact with the friction member 240.

Figure 5:
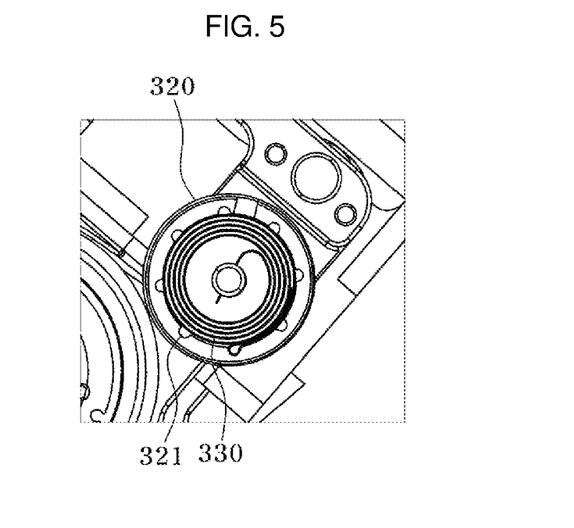
FIG. 5 is a view illustrating a combination of a contact member of a wheel assembly according to an exemplary embodiment of the present disclosure.

FIG. 5 illustrates the fastening relationship of a coil spring 330 positioned on the lever arm 310 As illustrated, a first end of the coil spring 330 may be fixed by the fixing pin 350, and a second end of the coil spring 330 may be fixed to the groove 321 positioned on the inside of the contact member 320. Further, according to one exemplary embodiment of the present disclosure, the contact member 320 including 8 grooves 321 is provided, and the second end of the coil spring 330 may be fastened to one of the plurality of grooves 321.

The coil spring 330 may be configured to provide the reaction force to the friction member 240 that corresponds to the rotation of the arm hinge part 210 in a state where the contact member 320 and the friction member 240 come in contact with each other, and the level of the foot effort (e.g., degree to which the pedal is engaged or the amount of force exerted onto the pedal) may be determined based on the provided reaction force. Accordingly, if it is required to change the reaction force provided from the coil spring 330 through providing of the plurality of grooves 321 on the inside of the contact member 320, tuning becomes possible by changing the position of the groove 321 on the inside of the contact member 320. When providing the reaction force to the contact member 320 using the coil spring 330, the foot effort increases linearly without operational heterogeneity, and thus immediate reaction becomes possible.

Figure 6A:
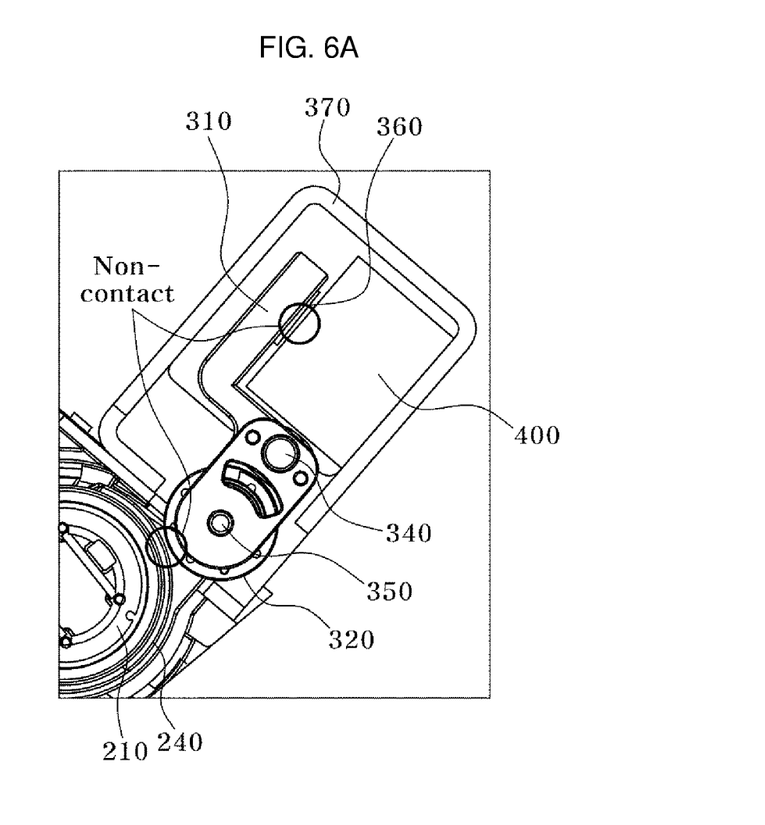
FIG. 6A is a side view illustrating a non-contact state of an arm lever according to an exemplary embodiment of the present disclosure.
Figure 6B:
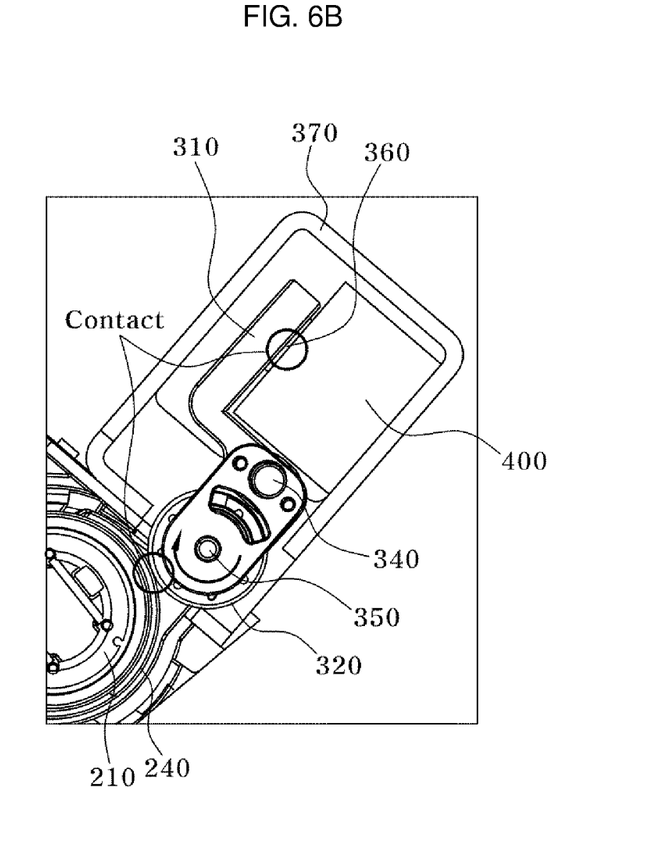
FIG. 6B is a side view illustrating a contact state of an arm lever according to an exemplary embodiment of the present disclosure.

FIGS. 6A and 6B illustrate a configuration in which a lever arm 310 is rotated in accordance with an application of a magnetic force to a magnetic member 400. FIG. 6A illustrates the positional relationship of a lever arm 310 if an input is not applied onto a pedal part 110 or if the number of inputs onto a pedal part 110 is equal to or less than a predetermined number of times.

When a magnetic force is not applied to the controller 500, a first end of the lever arm 310 may be maintained to be spaced apart from the friction member 240, and the second end of the lever arm 310 may be positioned to be spaced apart from the magnetic member 400. In the above-described state, the controller 500 may be configured to determine a user's input signal onto the pedal part 110 (e.g., a user's input or engagement onto the pedal). In particular, the controller 500 may be configured to determine whether an input (e.g., force exertion) onto the pedal part 110 occurs using the electronic accelerator pedal position sensor. In other words, the pedal position sensor may be configured to detect an engagement of the accelerator pedal.

In an exemplary embodiment of the present disclosure, the controller 500 may configure, as a foot effort generation signal, a case where the number of inputs onto the pedal part 110 is equal to or greater than a predetermined value as a condition. In response to the foot effort generation signal being measured by the controller 500, current may be applied to the magnetic member 400 through a battery mounted within the vehicle.

FIG. 6B illustrates the configuration of a wheel assembly 300 in a state where current is applied to the magnetic member 400 and a magnetic force is generated in the magnetic member 400. As illustrated, an attractive force may be generated in the metal member 360 positioned at the first end of the lever arm 310 by the magnetic force of the magnetic member 400, and the lever arm 310 may be rotated so that the metal member 360 comes in contact with the magnetic member 400.

Further, with the rotation of the lever arm 310, the contact member 320 that is adjacent to the arm hinge part 210 may be positioned to simultaneously come in contact with the friction member 240 of the arm hinge part 210. The input onto the pedal part 110 may be transferred to the arm lever 220 through the connecting part 130, and the arm hinge part 210 may be rotated counterclockwise corresponding to the downward movement of the arm lever 220.

The contact member 320 fastened to the arm hinge part 210 rotated counterclockwise may be rotated clockwise based on the fixing pin 350, and the coil spring 330 fixedly positioned on the inside of the contact member 320 may be compressed to provide a reaction force to the contact member 320. Through the applied reaction force of the coil spring 330, the contact member 320 may be configured to provide the reaction force to the friction member 240, and together with the spring part 230 providing an elastic force to the arm lever 220, the contact member 320 may form the vehicle accelerator pedal 100 having a minimal foot effort variation.

As described above, the detailed explanation exemplifies the present disclosure. Further, the above-described contents are to explain an exemplary embodiment of the present disclosure, and the present disclosure maybe used in various different combinations, variations, and environments. In other words, variations or corrections are possible within the range of the concept of the present disclosure disclosed in the description, within the range equivalent to the above-disclosed contents, and/or within the range of the technology or knowledge in the art.

The described exemplary embodiment is to explain the best state for embodying the technical idea of the present disclosure, and various modifications required in the detailed application fields and usage purposes are possible. Accordingly, the foregoing detailed explanation of the present disclosure is not intended to limit the present disclosure to the disclosed exemplary embodiment. Further, the appended claims should be interpreted to include other exemplary embodiments.

What is claimed is:

1. An accelerator pedal for a vehicle, comprising:
   a member fixed to the vehicle;
   a pedal part pivotally fastened to an upper surface of the member;
   an arm assembly positioned on the member and rotated based on an input onto the pedal part;
   a spring coming in contact with the arm assembly; and
   a wheel assembly adjacent to a first end of the arm assembly and to provide a foot effort to the arm assembly,
   wherein the wheel assembly includes a driving unit provided at a second end of a lever arm positioned on an inside of a cover part and applying a rotating force to rotate the lever arm around a hinge pin fixed to the member to rotate the lever arm,
   wherein the driving unit includes a metal member positioned on the lever arm and a magnetic member positioned adjacent to the metal member, and
   wherein the magnetic member is configured to selectively come in contact with the metal member.

2. The accelerator pedal of claim 1, wherein the wheel assembly includes:
   a contact member positioned at a first end of the lever arm facing the arm assembly;
   a coil spring positioned on an inside of the contact member and applying a reaction force to the contact member;
   a fixing pin fixing the contact member to the lever arm.

3. The accelerator pedal of claim 2, wherein a first end of the coil spring is fixed by the fixing pin, and a second end of the coil spring is fixed to the contact member.

4. The accelerator pedal of claim 1, wherein the arm assembly includes:
   an arm hinge part positioned adjacent to the wheel assembly; and
   an arm lever positioned between the pedal part and the arm hinge part.

5. The accelerator pedal of claim 4, wherein the arm hinge part further includes a friction member at a position where the arm hinge part comes in contact with the wheel assembly.

6. The accelerator pedal of claim 4, wherein one end of the wheel assembly adjacent to the arm hinge part is formed in a circular arc shape.

7. The accelerator pedal of claim 4, wherein the spring is positioned between the arm lever and the member.

8. The accelerator pedal of claim 1, wherein the first end of the wheel assembly is rotated and the second end of the wheel assembly comes in contact with the arm assembly to apply the foot effort to the arm assembly and to apply the foot effort to the pedal part.

9. The accelerator pedal of claim 1, further comprising a connecting part interlocking the arm assembly and the pedal part interlock with each other.

* * * * *